Dec. 22, 1964   W. T. HARDISON   3,162,172
INSTRUMENT SHAFT POSITION INDICATING STRUCTURE
Filed March 13, 1963   2 Sheets-Sheet 1
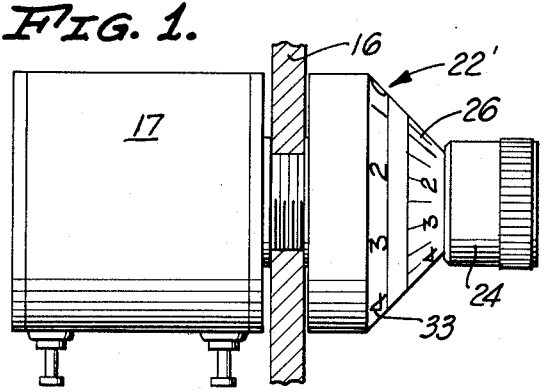
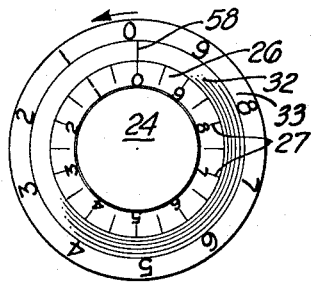
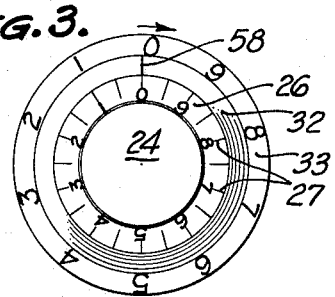
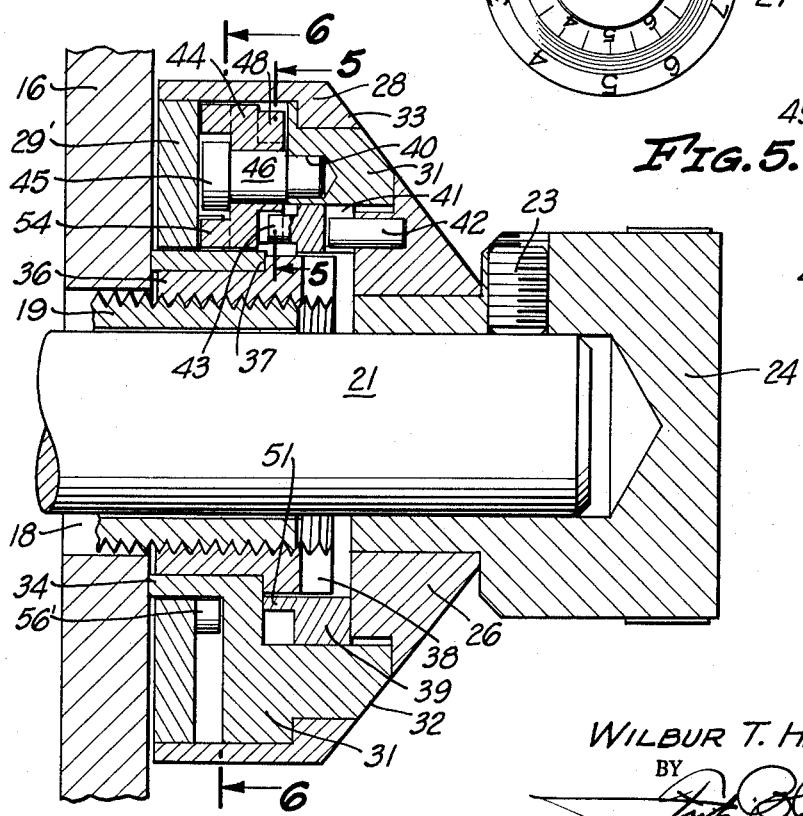
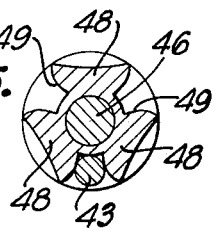
INVENTOR.
WILBUR T. HARDISON
BY

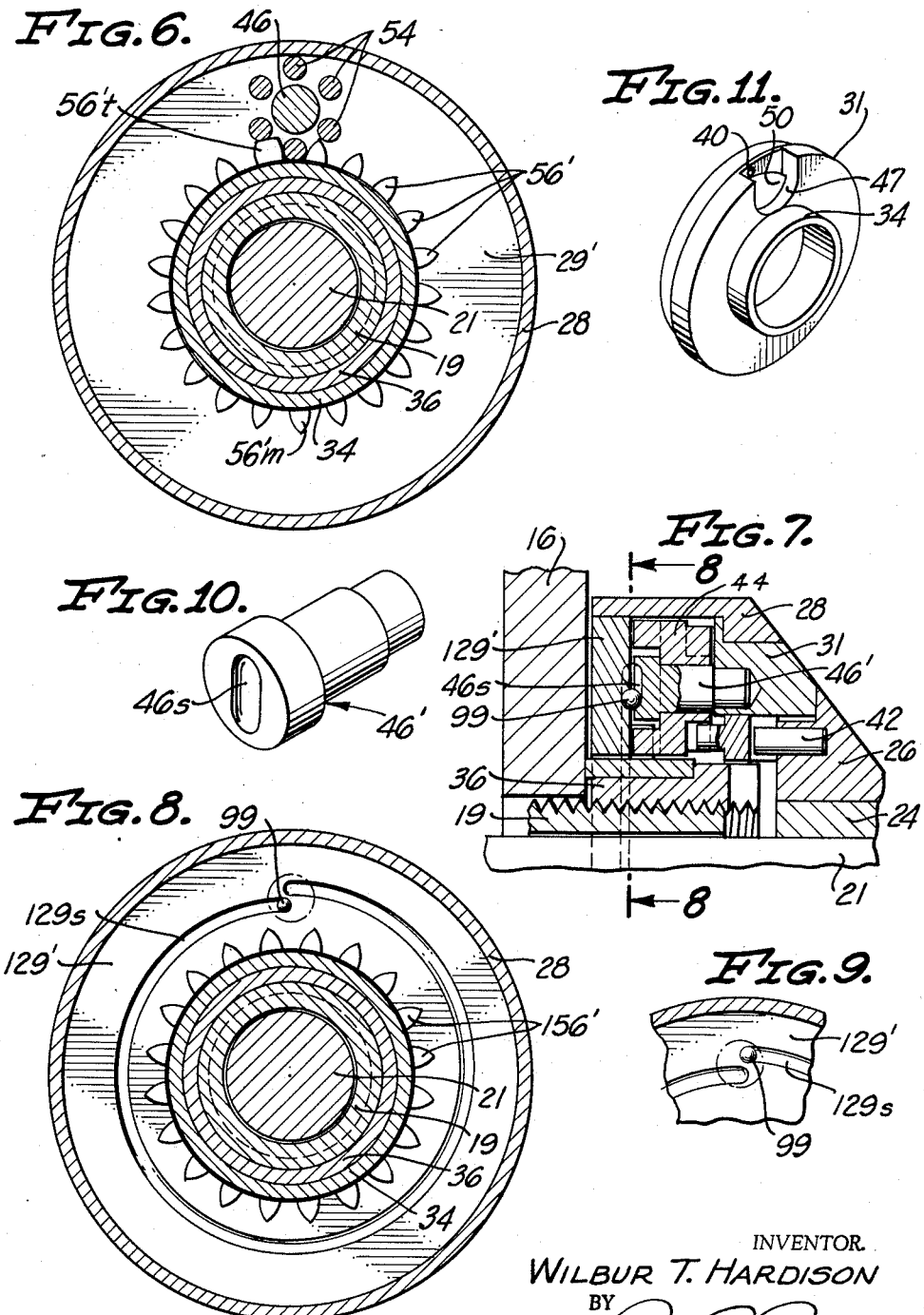

United States Patent Office 3,162,172
Patented Dec. 22, 1964

3,162,172
INSTRUMENT SHAFT POSITION INDICATING STRUCTURE
Wilbur T. Hardison, Riverside, Calif., assignor to Bourns, Inc., a corporation of California
Filed Mar. 13, 1963, Ser. No. 264,833
7 Claims. (Cl. 116—115)

The invention herein disclosed pertains to rotary instruments of the class by means of which a physical characteristic, such as electrical resistance, is made variable between two extremes or limits of adjustment; and in which the adjustment of the instrument between the limits is effected by rotation of a shaft through a definite number, N, of full revolutions. More particularly, the present invention pertains to improvements in means provided for manual rotation of the adjustment shaft with concurrent visible indication of the extent of rotation of the shaft as measured from one limit.

As examples of the type or class of instruments here of interest, potentiometers or variable resistors of the so-called "multiturn" type may be mentioned. Examples of that type of instruments are illustrated in U.S. Patents Nos. 1,450,919; 1,918,013; 2,454,986; 2,558,326; 2,724,034; and 2,813,182.

In some of the practical applications of such limited "multiturn" instruments it is of value for a technician or operator to have available a visible indication of the state of adjustment of the instrument, whereby a more-or-less accurate estimate of the value of the variable being adjusted may be made, or whereby the instrument may, after manipulation, be re-adjusted to a previous setting or adjustment. To provide such indications, a variety of dials and other devices generally called indicators have been devised and placed on the market. In most cases, as is true of the instruments with which the present invention is concerned, the instrument is so constructed and arranged that variation through the complete range of adjustment is effected by rotation of the adjusting shaft through a definite predetermined number of full revolutions or turns. That number is herein denoted N for convenience. A typical multiturn potentiometer, for example, may comprise a helical resistance element whose electrical length (the electrically active portion between the high- and the low-potential terminals) is comprised in ten ($N=10$) convolutions or turns of the element device; and the potentiometer contact or slider is accordingly arranged so that ten revolutions of relative rotation between the element and the contact encompasses the complete range of adjustment. Further, such relative rotation may be, and usually is, restricted to N revolutions. It is evident that the same considerations apply in those constructions wherein N is some other whole number, such as 2, or 5, or 20, etc.

In the prior art adjustment indicators it is usual to find a dial or ring bearing a circularly-arranged series of numerical indicia, and first and second indicator devices movable past the indicia (or vice versa) the first device arranged for rotation through one full revolution for each revolution of the adjusting shaft to thus provide indications of fractional portions of a full revolution as measured from a base or zero, and the other device arranged for rotation through $1/N$ fractional part of a revolution for each full revolution of the adjusting shaft. Thus the common practice is to drive the first indicator device directly from the adjustment shaft of the instrument and to rotate or move the second indicator device by suitable power-transmission means such as gearing or Geneva motion means, so that the second device moves from digit to digit of the indicia as successive full-turn rotations of the adjustment shaft are accomplished. Thus, in the usual construction, with the instrument adjusted to the lower limit of its adjustment, the indicator devices are set at the zero of the indicator scale; and the fractional-turns indicator moves continuously through successive complete turns and the second indicator moves (either continuously or by stepwise movements) past the numerical digits, until both indicator devices arrive at the zero point on the scale when the upper limit of adjustment has been reached.

While in many applications of multiturn instruments it is immaterial that the indicator devices repose at the zero (0) mark at both the high limit of adjustment and at the low limit as well, there are instances when it is critically important to know whether the instrument is set at the high limit or at the low limit and it is equally important to leave the adjustment undisturbed. Under those circumstances, tedious and undesirable test procedures are at present involved in determining at which limit of adjustment the instrument is set, since in either case the two indicating devices provide no clue as to whether the instrument is at the upper limit or at the lower limit. The invention hereinafter described provides means whereby the indicator mechanism provides markedly different, readily perceptible and unambiguous indications at the respective limits of adjustment of the instrument, and thus obviates the aforementioned difficulty. The invention accomplishes that result by providing a construction or means by which the second or complete-revolution indicator device is prohibited from reaching the zero of the scale from either direction, while still permitting the adjusting shaft to be rotated to adjust the instrument alternatively to both of the extremes or limits. Thus as the adjustment proceeds toward the low limit and the zero point is nearly reached, the first indicator device continues undisturbed to the zero mark or reading, but the second indicator is caused to stop immediately prior to reaching the zero and at a position or attitude slightly "above" the zero where it thus indicates that the instrument is set at the lower limit of its range and that change, if any is to be made, must be made forwardly, that is, toward the upper limit. Similarly, as adjustment proceeds toward the high limit and that limit is nearly reached, the first indicator device continues undisturbed to the zero point of the scale but, as at the low limit of adjustment, the second indicator is not permitted to proceed (or is not driven) all the way to zero but remains slightly "below" the zero and thus provides an unambiguous indication that the instrument is set at the upper limit of its range of adjustment.

Several means of putting into effect the principle of the invention are contemplated, but for convenience and as illustrated in a preferred exemplary form depicted in the accompanying drawings and herein described, certain modifications of a known shaft-position indicating dial structure are made whereby the principles of the invention are incorporated and the desired novel results are attained. The mentioned known indicating dial structure is illustrated in U.S. Patent No. 2,805,636, to which patent reference may be made in respect of details not herein required to be repeated. The disclosure of that patent, and those of the previously mentioned U.S. patents, are incorporated herein by reference in the interest of brevity and clarity, it being understood that such disclosures are prior art and necessary herein only as illustrative of the prior art. Further, to facilitate correlation of details of the structure depicted in the accompanying drawings with those of the prior art indicator structure, reference numerals will be the same in instances where the parts are to all intents and purposes the same, and similar parts that have been modified will herein bear corresponding numbers with primes added.

The preceding general description of the deficiencies of the prior art devices makes it evident that a prime object of the invention is to provide improvements in shaft-position indicators of the type used for indicating the numbers of full revolutions and the fractional part of one revolution that a shaft has been rotated from a predetermined or "zero" angular reference point or position.

Another object of the invention is to provide a shaft-positioning indicator adapted for use with an instrument the adjusting shaft of which is turned through a fixed number N of complete revolutions in adjusting the instrument from either limit of adjustment to the other limit, and which shaft-position indicator will provide unambiguous different visible indications representing respective positions of the shaft at the opposite limits of adjustment rotation.

Other objects of the invention will be set out in the appended claims or made evident in the following description of preferred embodiments of the invention, in which description reference is made to the accompanying drawings forming a part of this specification. In the drawings:

FIGURE 1 is a side view of a plural-turn (multiturn) instrument in the form of a ten-turn helical-element potentiometer mounted on a panel and having an adjustment shaft on which is mounted a position-indicating device according to the invention;

FIGURE 2 is a face or outer end view of the instrumentalities depicted in FIGURE 1, with the panel removed, with a full-turn indicator device indicating the position of the adjustment shaft at the "upper" limit of the adjustment;

FIGURE 3 is a view similar to FIGURE 2, but depicting the full-turn indicator device indicating the position of the shaft at the "lower" limit of the adjustment;

FIGURE 4 is an enlarged longitudinal view of a portion of the structure depicted in FIGURE 1, partially in section, revealing details of internal structure;

FIGURE 5 is a fragmentary sectional view, taken as indicated by line 5—5 of FIGURE 4;

FIGURE 6 is a fragmentary sectional view, taken as indicated by line 6—6 of FIGURE 4;

FIGURE 7 is a fragmentary view partially in section, similar to a portion of FIGURE 4, revealing a modified form of certain parts of the device;

FIGURE 8 is a fragmentary sectional view, similar to FIGURE 6 but revealing details of the modified form of a part of the device;

FIGURE 9 is a fragmentary detail, similar to a portion of FIGURE 8, but showing parts at a different extreme or limit;

FIGURE 10 is a pictorial view of a part of the structure depicted in FIGURE 7; and FIGURE 11 is a pictorial detail view of a part of the indicator.

In the drawings, the instrument whose adjusting-shaft is here of concern is denoted 17 and is for illustrative purposes and for convenience only selected as a ten-turn rotary potentiometer. In the several drawings various scales of enlargement are used as required to show detail. The instrument or potentiometer is mounted on a panel 16. An axially-bored threaded boss 19 (FIGURE 4) forming part of the mounting means of the potentiometer or instrument extends through a hole 18 formed in the panel. The boss 19 may, for example, be such as boss 19 of the aforementioned prior-art structure illustrated in Patent 2,805,636, as hereinbefore indicated. The adjustment shaft 21 of the potentiometer is journaled in the bore of boss 19. Rotation of shaft 21 positions the potentiometer contact or other adjustable component (not shown) in a manner well known in the art, and by suitable means within the instrument the shaft is restricted to ten (N) turns from either extreme or limit of rotation. Indication of the position of shaft 21, rotationally, relative to either extreme or limit of rotary movement, is the function of the indicating means comprised in the present invention.

Secured over the end of the shaft 21 (FIGURE 4) by one or more set screws 23 is an actuating knob 24. Press fitted over a reduced inner end of the knob 24 is a bezeled inner dial 26 which, together with the knob 24, constitutes an actuating or driving means for the shaft 21. The outer periphery of the dial 26 is divided into N equal divisions indicated by the numbered lines 27, each of which is in turn divided into ten equal divisions (not shown).

Adjacent the panel 16 is disposed a rotatably mounted outer dial composed of an outer dial ring 28 into the rear of which is press fitted a circular plate 29'. The outer dial ring 28 is rotatably held in position over the boss 19 by a stator in the form of a stationary index member or ring 31 having a bezeled annular face 32 (FIGURE 3) which is flush with the bezeled face of the inner dial 26 and the bezeled face 33 of the outer dial 28. The stator or ring 31 has a cylindrical flange 34 which extends through an axial opening in the plate 29' into butting relation with the panel 16, as shown in FIGURE 4. The ring 31 is clamped firmly against the panel 16 by a mounting nut 36 threaded to the boss 19 and having a shoulder 37 which engages a corresponding shoulder on the stator 31 at the end of the flange 34 to hold the stator firmly against the panel 16. Diametric notches 38 are formed in the end of the nut 36 to provide a means whereby a wrench may be engaged with the nut 36. By the structure thus described, the outer dial ring 28 with its plate 29' is restrained against axial movement, but is free to rotate on the flange 34 coaxially of the boss 19; the ring 31 is clamped firmly against the panel 16. This requires the set screws 23 to secure only the knob 24 and inner dial 26, thereby lessening the vibration stress on the screws 23 and shaft 21.

Interposed between the inner dial 26 and the ring 31 is a self-aligning coupling ring 39, which is freely rotatable in a cavity formed by the ring 31, the nut 36 and the dial 26, as shown in FIGURE 4. The ring 39 is free for slight lateral shifting to accommodate for any slight axial misalignment between shaft 21 and ring 31. The coupling ring 39 has a radial notch 41 formed therein in which resides a pin 42 fixed in the dial 26 and extending outwardly therefrom into the notch 41. Also formed on the ring 39, in line with the notch 41, is a pin 43 which forms part of the escapement mechanism by means of which each full revolution of the dial 26 imparts an intermittent partial revolution to the outer dial 28.

Such intermittent motion is imparted by means of an escapement gear 44 journalled on a shaft 46 pressed into a hole 40 formed in the ring 31, and having a head 45 which restrains gear 44 axially. The escapement gear 44 rides in a U-shaped recess 47 formed in the rear face of the ring 31 (FIGURE 11), which communicates at 50 through the ring 31, so that the forward face of the escapement gear 44 has access to the pin 43 on the coupling ring 39 and the rear face of the escapement gear 44 has access to the plate 29 of the outer dial 28.

On the forward face of the gear 44 are formed escapement gear teeth 48 which are adjacent radial notches 49 formed in the forward face of the gear 44. The notches 49 are adapted to be engaged intermittently by the pin 43 as the ring 39 is rotated by the inner dial 26. In addition to the pin 43 the coupling ring 39 carries a circumferential flange having a gap therein, the pin 43 being disposed radially outward of, and opposite, the gap, as fully illustrated in Patent No. 2,805,636 and therein described at column 3 lines 26–46. The flange cooperates with the pin 43 to complete a 120° revolution of the escapement gear 44 with each full revolution of the coupling ring 39 (and dial 26). After the pin 43 and the flange have effected an escapement motion of the gear 44 and passed beyond the gear, the flange also serves to keep the gear 44 locked in proper position against accidental rotation, in the manner common to Geneva gearing. This is effected by forming concave surfaces on the front face of the gear 44, these surfaces being of radius approximately equal to that of the flange, so that they rest closely adjacent the flange and therefore restrain the gear 44 against accidental rotation. Other details of the intermittent-motion mechanism are disclosed in detail in Patent 2,805,636, to which reference may be made. As is there explained, gear 44 is rotated through 120° each time ring 39 completes one revolution.

The rear face of the gear 44 is provided with six circular pin teeth 54 (FIGURE 6) which mesh with teeth 56' extending from the plate 29' parallel to the axis of the shaft 21. The inner edges of the teeth 56' ride on a circle and lie closely adjacent the cylindrical flange 34 of the stator 31, as shown in FIGURE 6. In the embodiment shown, there are six teeth 54 and twenty one teeth 56'; thus each 120° revolution of the escapement gear 44 causes two of the teeth 54 to pass in engagement with a corresponding two of the teeth 56', with consequent rotation of the outer dial 28 through approximately 2/21 part of a revolution.

The points of all but one of the teeth 56' extend radially outward beyond the engaged tooth 54 (FIGURE 6), and in general the teeth may be formed as indicated in Patent No. 2,805,636, as modified by the following: (1) a single flat faced tooth 56't (FIGURE 6) is made slightly wider than the pitch circle thickness of the other teeth, as indicated; (2) there are provided twenty teeth in addition to tooth 56't on plate 29', and hence the pitch diameter of the 21-tooth gear is slightly larger than its prior-art counterpart and that of gear 44 is slightly smaller, with complementary changes in tooth sizes; (3) an inter-tooth space is disposed diametrically opposite tooth 56't; (4) each of the teeth 56' excepting tooth 56't is made slightly thinner than would be the case of the uniformly spaced teeth (56) depicted in the patented structure; (5) the teeth between tooth 56't and 56'm are uniformly spaced apart as indicated in FIGURE 6 so that all of the spaces between the teeth are of equal pitch dimension; and (6) a slight change in the disposition or spacing of indicia on dial 33 may optionally be made.

The relationship of the teeth 54 and tooth 56't when shaft 21 is at the upper limit of its adjustment is as depicted in FIGURE 6. At that position, the zero of inner dial 26 is disposed in alignment with the ledger mark 58, as indicated in FIGURE 2; but the zero indicia on the outer dial 28 is disposed slightly to the left of the ledger mark, as depicted, because of engagement of one of teeth 54 of gear 46 with the flat outer face of wide tooth 56't as indicated in FIGURE 6. The plate 29', on which tooth 56't is formed, cannot be rotated further in the clockwise (increasing) direction because of the interference between tooth 56't and one of teeth 54. Thus presence of the zero of inner dial 26 at the ledger line and concurrent presence of the zero of outer dial 33 slightly to the left of the ledger mark indicates that the instrument is adjusted to the upper limit, and that any adjustment must be in a decreasing sense (counterclockwise as shown).

Similarly, when the shaft 21 is rotated to the low limit, tooth 56't is again engaged by one of teeth 54, but at the opposite side of the plane intersecting the axes of the two gears; and the zero of the outer dial will come to rest somewhat to the right of ledger line 58 as indicated in FIGURE 3. Thus presence of the zero of the inner dial in alignment with ledger line 58 and concurrent presence of the zero of the outer dial to the right of the ledger line provides unambiguous indication that the instrument is at the lower limit of its range of adjustment and any rotation of shaft 21 will be in the increasing sense (clockwise as shown).

It will be evident to those skilled in the art that in those instances in which the construction of the instrument to be adjusted is such that shaft 21 must be rotated counterclockwise from a low limit to increase the quantity being varied, simple reversals of indicia and gearing relationships are all that is required to accommodate the indicator means to such reversal.

In FIGURES 7, 8, 9 and 10 a modified form of means for limiting rotation of outer dial 28 is depicted. Therein parts similar to parts described in the aforementioned Patent No. 2,805,636 will bear corresponding numbers with added prime ('), and those parts which may be otherwise the same as those shown in the patent will bear corresponding numbers. Except as to shaft 46, plate 29, and an added part hereinafter described, the structure may be substantially identical with that shown in the patent.

In the modified form of device the fixed shaft 46' on which the escapement gear 44 rotates is provided with a slot 46s in the face of its head, as indicated in FIGURE 10. The slot is formed with a nearly semicircular cross section (as with a spherical mill), so as to accommodate nearly one half of a small steel ball presently to be described; and the slot is of length approximately twice the diameter of the ball. The face of the head of shaft 46' is closely adjacent to the front face of plate 129', which corresponds to plate 29 of the patented structure. The face-abutting relationship is illustrated in FIGURE 7 (and in FIGURE 3 of the patent). The front face of plate 129' is provided with a spiral groove or slot 129s of nearly semicircular cross section (FIGURE 8), the ends of which are each closely adjacent the other and disposed so as to arcuately overlap to a slight extent as indicated. The radial disposition of slot 129s is such that a portion of the slot will always face a portion of slot 46s of shaft 46', and thus there may be accommodated, partly in slot 46s and partly in slot 129s, a small ball 99. Shaft 46' is assembled with ring 31 so that slot 46s is substantially radially oriented relative to the axis of shaft 21, as is indicated in FIGURE 7. With ball 99 positioned between shaft 46' and plate 129' and partly within each of the described slots, it is evident that during rotation of knob 24 through nearly one complete revolution starting from the low limit or "zero" of the instrument, plate 129' and ball 99 do not move. With continued forward rotation of knob 24, the escapement mechanism will induce step-by-step clockwise rotation of dial 28, and during that rotation ball 99 will be moved, stepwise, from a radially innermost position in slot 46s (FIGURES 7 and 8) to a radially outermost positioned as depicted in FIGURE 9. The outward migration of ball 99 is caused by the sidewalls of slot 129s as plate 129' rotates, ball 99 during the rotation moving from a position depicted in FIGURE 8 (at the innermost end of slot 129s) to a position depicted in FIGURE 9. As is evident, the coaction of ball 99 with the sidewalls and endwalls of slots 129s and 46s is such as to effectively limit the extent of rotation of plate 129', and hence the zero (0) mark thereon. Thus it is apparent that by selection of the dimensions of ball 99 and the grooves 46s and 129s, the radial disposition or distance of slot 129s from the axis of shaft 21, and the angular length of slot 129s, the ball will cause dial 28 to be stopped, irrespective of direction of rotation, before the zero on that dial can come into complete registry with the ledger mark 58 on stator 31. Further, such action does not prevent the inner indicator device (dial 26) from being rotated through ten full turns. By providing slightly greater than normal clearance between the teeth 54 of gear 44 and teeth 56 of plate 129', and between the concave surfaces of the gear 44 and the flange of ring 39, the aforedescribed actions are readily accommodated by the mechanism. It will be noted that the inherent accuracy of the inner dial is in no way adversely affected by the improvements made in the patented structure. The outer dial, which serves only to provide an indication of complete turns of the adjusting shaft, is required in all cases to be accurate to only approximately $1/N$ revolutions or turns; and hence the slight enforced restriction as its zero mark moves close to ledger line 58 on the rotor is of no consequence. An operator or technician is thus provided with an easily noted visual indication of which extreme position or limit the adjusting shaft has been turned to, without any sacrifice of accuracy of indication of partial-turn rotation from the zero point of any one of the N revolutions possible.

The preceding description has made it evident that the aforementioned objects of the invention have been fully attained. In the light of the present disclosure it is evident that many changes and modifications within the true scope and spirit of the invention will occur to others; and accordingly I do not wish to limit the invention to exact details of the described structure, but I claim:

1. An instrument shaft position indicating structure adapted for use with an instrument having a rotary adjustment shaft arranged for rotation through a whole number N of turns in adjusting the instrument from a lower limit to an upper limit of adjustment thereof, said structure comprising:

first means, including rotatable means arranged to be secured to such an adjustment shaft for rotation therewith;

second means, comprising stationary support means and ledger means supported thereby furnishing a ledger base of reference;

third means, including first rotary means disposed adjacent said second means and providing a circular array of numerical indicia including a reference indicia and said indicia arranged for movement past said ledger, said first rotary means being connected to and rotatable in unison with said rotatable means and thus cooperate with said ledger to furnish a visible indication of the fractional part of one revolution of rotation of said rotatable means following registry of said reference indicia with said ledger;

fourth means, including second rotary means providing a second circular array of numerical indicia including a second reference indicia and the latter numerical indicia being arranged for movement of any of the indicia of said latter array to and from positions adjacent said ledger; and fifth means, comprising power-transmitting means interposed between and connected to said third means and said fourth means, arranged to transmit rotary motion from said first rotary means to said second rotary means to rotate the latter whereby during rotation of said first rotary means through N complete revolutions the said second reference indicia is rotated from a position closely adjacent to and at one side of said ledger to a position closely adjacent to and at the other side of said ledger, whereby there are provided unambiguous different indications of the rotational attitude of said rotatable means at the respective opposite limits of adjustment of the instrument.

2. A structure according to claim 1, said fifth means comprising gearing means for converting continuous rotary motion to intermittent rotary motion, to intermittently and stepwise advance indicia of said second circular array of numerical indicia in turn to positions closely adjacent to said ledger to provide indications of the number of complete revolutions of said shaft from said lower limit.

3. A structure according to claim 1, said fifth means comprising means restricting movement of said second rotary means to less than 360° of rotation, whereby to positively limit terminal movement of said second reference indicia to close approach only to said ledger at both limits of rotation of said shaft.

4. A structure according to claim 1, said fifth means comprising gearing arranged to tend to move said second rotary means to tend to carry said second reference indicia into registry with said ledger, and means positively prohibiting registry of said latter reference indicia with said ledger.

5. A structure according to claim 1, said fifth means comprising a pinion gear, means to intermittently rotate the pinion gear, a driven gear meshed with said pinion gear and mechanically connected to rotate said second array of indicia, said driven gear comprising a mutilated tooth incapable of meshing with said pinion and acting with a tooth of the pinion as a stop to restrict rotation of said driven gear and said second rotary means in either direction to less than 360°.

6. A structure according to claim 1, said fifth means comprising a pinion shaft, a pinion gear on said pinion shaft, a driven gear meshed with said pinion gear, a plate directly driven by and coaxial with said driven gear and mechanically connected to drive said second array of indicia, a spiral groove provided on said plate, a groove in said pinion shaft facing said plate and complementary with said spiral groove, and a ball disposed in part in each of said grooves, the dimensions of said ball and of said grooves being such that rotation of said plate is restricted to less than 360° whereby said second reference indica cannot be rotated into registry with said ledger but can be rotated into close proximity thereto on opposite sides thereof at respective limits of rotation of said shaft.

7. An instrument shaft position indicating structure adapted to be secured to and used with an instrument having a rotary adjustment shaft arranged for rotation through N complete rovolutions in adjusting the instrument from a lower limit to an upper limit of adjustment thereof and vice versa, said structure comprising:

first means, including first rotary means arranged to be secured to such instrument shaft for rotation in unison therewith through N complete revolutions from a lower limit to an upper limit of rotation and including means providing a first circular array of numerical indicia including a first reference indicia;

second means, comprising stationary means and means for the support thereof adjacent said array of numerical indicia, providing a stationary ledger mark past which said numerical indica pass during rotation of said first rotary means;

third means, including second rotary means mechanically connected with said first means and with said second means and providing a second array of numerical indicia including a second reference indicia disposed adjacent said ledger mark, said second rotary means comprising power transmitting means connected to said first means to be driven thereby to impart rotation to said second rotary means and said second rotary means being arranged to rotate said second array of numerical indicia slightly less than one complete revolution incident to rotation of said first rotary means through N complete revolutions, and said third means comprising cooperative devices effective to positively restrict rotation of said second rotary means to less than one complete revolution in either direction, whereby said second reference indicia incident to rotation of said first rotary means to said lower limit of rotation is moved to a position closely adjacent to said ledger but displaced therefrom in a first direction and incident to rotation of said first rotary means to said upper limit of rotation is moved to a position closely adjacent to said ledger but displaced therefrom in a second direction, whereby said ledger and said second reference indicia provide respective different and unambiguous visible indications of the rotational position of said first rotary means at said upper and lower limits of rotation.

References Cited by the Examiner

UNITED STATES PATENTS

| | | | |
|---|---|---|---|
| 304,080 | 8/84 | Davies | 58—83 |
| 2,558,326 | 6/51 | Van Dyke | 338—149 |
| 2,599,934 | 6/52 | Opocensky | 74—10.2 |
| 2,640,456 | 6/53 | De Giers | 116—129 |
| 2,746,573 | 5/56 | Hastings | 74—10.2 |
| 2,780,941 | 2/57 | Kollmorger | 74—10.2 |
| 2,805,636 | 9/57 | Smith | 116—115 |
| 2,980,055 | 4/61 | Burns | 116—124 |
| 2,991,662 | 7/61 | Werner | 74—10.2 |
| 3,015,793 | 1/62 | Fraser et al. | 74—10.2 |
| 3,121,210 | 2/64 | Orozco | 74—10.2 |

FOREIGN PATENTS

| | | |
|---|---|---|
| 43,058 | 3/08 | Switzerland. |
| 155,513 | 9/32 | Switzerland. |

LOUIS J. CAPOZI, *Primary Examiner.*